(12) United States Patent
Blincoe

(10) Patent No.: US 10,726,695 B1
(45) Date of Patent: Jul. 28, 2020

(54) BUILDING SAFETY SYSTEM

(71) Applicant: Rodney Craig Blincoe, Highlands Ranch, CO (US)

(72) Inventor: Rodney Craig Blincoe, Highlands Ranch, CO (US)

( * ) Notice: Subject to any disclaimer, the term of this patent is extended or adjusted under 35 U.S.C. 154(b) by 0 days.

(21) Appl. No.: 16/658,034

(22) Filed: Oct. 19, 2019

(51) Int. Cl.
*G08B 17/06* (2006.01)
*H04L 29/08* (2006.01)
*H04W 4/80* (2018.01)

(52) U.S. Cl.
CPC ............... *G08B 17/06* (2013.01); *H04L 67/12* (2013.01); *H04W 4/80* (2018.02)

(58) Field of Classification Search
CPC ..................................... H04L 1/00; G06F 1/00
See application file for complete search history.

(56) References Cited

U.S. PATENT DOCUMENTS

| | | | |
|---|---|---|---|
| 2006/0181408 A1* | 8/2006 | Martin | G08B 13/00 340/528 |
| 2011/0148193 A1* | 6/2011 | Reid | H05B 47/18 307/18 |
| 2016/0218884 A1* | 7/2016 | Ebrom | D06F 33/02 |
| 2018/0204441 A1* | 7/2018 | Zribi | G08B 1/08 |
| 2019/0353377 A1* | 11/2019 | Mao | F24F 11/49 |

\* cited by examiner

*Primary Examiner* — Shirley Lu
(74) *Attorney, Agent, or Firm* — Roger A. Jackson

(57) ABSTRACT

A building safety system that receives a first communication from a fire sensing appliance and translates the first communication to a building system to effectuate a selected response from the building system, the fire control system including control circuitry in a ready state that is operative to monitor the first communication and to produce a first event marker signal upon receipt of the first communication, the first event marker signal is in a first electrical communication with the building system, wherein operationally the first event marker effectuates the selected response from the building system.

4 Claims, 5 Drawing Sheets

BUILDING SAFETY SYSTEM

TECHNICAL FIELD

The present invention relates generally to a system for controlling electrical signals. More specifically, the present invention relates to the field of building fire safety and control of building systems in the event of a building fire.

BACKGROUND OF INVENTION

Commercial buildings have long had additional fire safety procedures, inspections, and systems that residential buildings (housing) have typically not had, such as auto fire department calling when a fire detectors go off or when the building fire sprinkler system starting flowing, or when an exit door is opened, further commercial buildings can have Heating Ventilation and Air Conditioning (HVAC) systems automatically shutdown in the event of a fire to prevent spreading of toxic smoke, feeding the fire extra oxygen, or excessive cooling by the air conditioning system, also items like battery powered lighted EXIT signs in the event of electrical failure and smoke present and same goes for emergency stairway and hall lighting, in addition to auto closing of fire doors for fire suppression, auto elevator level defaults for fireman to use, auto ventilation systems for removing smoke, and the like.

However, for residential buildings, fire safety has been minimal or at a much lower level, which is curious as people sleep at home while they are awake at commercial buildings, i.e. while at work, so in a sense people are at more risk for fire danger at home while sleeping, so it is interesting that building fire codes are typically much more strict for commercial buildings verses residential buildings. Because of this there is a definite need for commercial type fire safety protection for residential buildings to enhance the safety of people in their homes, i.e. with a focus on automated systems that activate home building systems to enhance fire safety even while the home occupants are sleeping. There has been some activity in this area with KIDDE fire detectors that have wireless communication to one another, i.e. such that if there are multiple fire detectors within a single house and that if a single fire detector activates, then all the fire detectors alarm for notifying a house occupant that is located in the house in a remote area from the location of the original fire detection.

In looking at the prior art in the residential building digital transmission and data switching arts in U.S. Pat. No. 9,286,781 to Filson et al., discloses a smart home system that is assigned to Google that teaches digital interconnection between components that includes a thermostat, a fire detector, and cameras, using sensors that include smoke, audio, acceleration, seismic, temperature, humidity, and radiation, with all sensors communicating to an event processor that further analyzes the combination of sensor inputs to help ascertain whether an earthquake, tornado, power outage, or weather event has likely occurred, thus this system is primarily for notification purposes rather than any automated equipment change of operational state being effectuated.

Further in the above prior art area in U.S. Pat. No. 6,891,838 to Petite et al., disclosed is a monitoring and controlling system for residential buildings that includes a sensor that outputs a sensor data signal, a processor to format the sensor data signal for a particular function to evaluate the parameter for the sensor, and to create a follow on signal based on selected parameter values.

Continuing in the above prior art area in U.S. Pat. No. 10,403,127 to Sloo et al., disclosed is a smart home device that is assigned to Google wherein the smart home device provides follow up communications for detection events, the device includes a sensor that detects a dangerous condition in a home environment, a processor that determines a first state of moderate danger and then an second state then having the ability to determine whether the danger has ceased based on the first and second states, again this is a notification type system rather than an automated equipment change of operational state in reaction to sensor outputs.

Next in the above prior art area in U.S. Pat. No. 10,331,095 to Patel et al., discloses a method and system for an automation control device that includes a processor that is configured in response to receive an input message, map the message to a control message, and to determine a control action for the automation control asset.

Continuing in the above prior art area in U.S. Pat. No. 10,282,787 to Hakimi-Boushehri et al., disclosed is a system for determining a loss to a property that is assigned to State Farm Insurance, wherein the system includes a smart home controller that monitors a sensor that has data stored a baseline level of data, wherein when the sensor provides data outside of the baseline the controller will determine damage to the property based on the sensor input, and engaging in automated insurance company form submittal.

Moving onward in the above prior art area in U.S. Pat. No. 10,158,498 to Brandman et al., discloses a building sensor monitoring and control system that is assigned to the Hartford Fire Insurance Company, wherein the system includes multiple sensors that generate electronic signals that are evaluated for a risk situation, wherein signals with unique instructions are generated to try to mitigate the situation at the electromechanical device and if the conditions are not mitigated the system changes control parameters.

Further in the above prior art area in U.S. Pat. No. 10,361,878 to Loreille, discloses a system for initiating actions automatically on home smart devices that starts with a movement sensor action trigger signal that causes an action to initiate video recording and record a log.

What is needed is a building safety system that is positioned to fill a void in residential building fire protection being the failure to shut off the central ventilation system blower (HVAC) in the case of fire. In the event of a residential house fire when the HVAC unit is activated, the air blower (air conditioning) ramps up to compensate for the heat which further feeds the fire with oxygen from the air and spreads toxic gasses and smoke throughout the house further making the fire worse.

Currently in the prior art the vast majority of installed residential building fire alarm systems alert the user with a high-audible volume alarm appliance to allow the occupants to escape safely but do nothing to reduce the severity of the fire. The present invention is desirably easy to install and inexpensive that adds a layer of protection to residential buildings to help save lives and to help reduce property loss.

SUMMARY OF INVENTION

Broadly, the present invention is a building safety system that receives a first communication from a fire sensing appliance and translates the first communication to a building system to effectuate a selected response from the building system, the fire control system including control circuitry in a ready state that is operative to monitor the first communication and to produce a first event marker signal upon receipt of the first communication, the first event marker signal is in a first electrical communication with the building system, wherein operationally the first event marker effectuates the selected response from the building system.

These and other objects of the present invention will become more readily appreciated and understood from a consideration of the following detailed description of the exemplary embodiments of the present invention when taken together with the accompanying drawings, in which;

REFERENCE NUMBERS IN DRAWINGS

Figure 1:
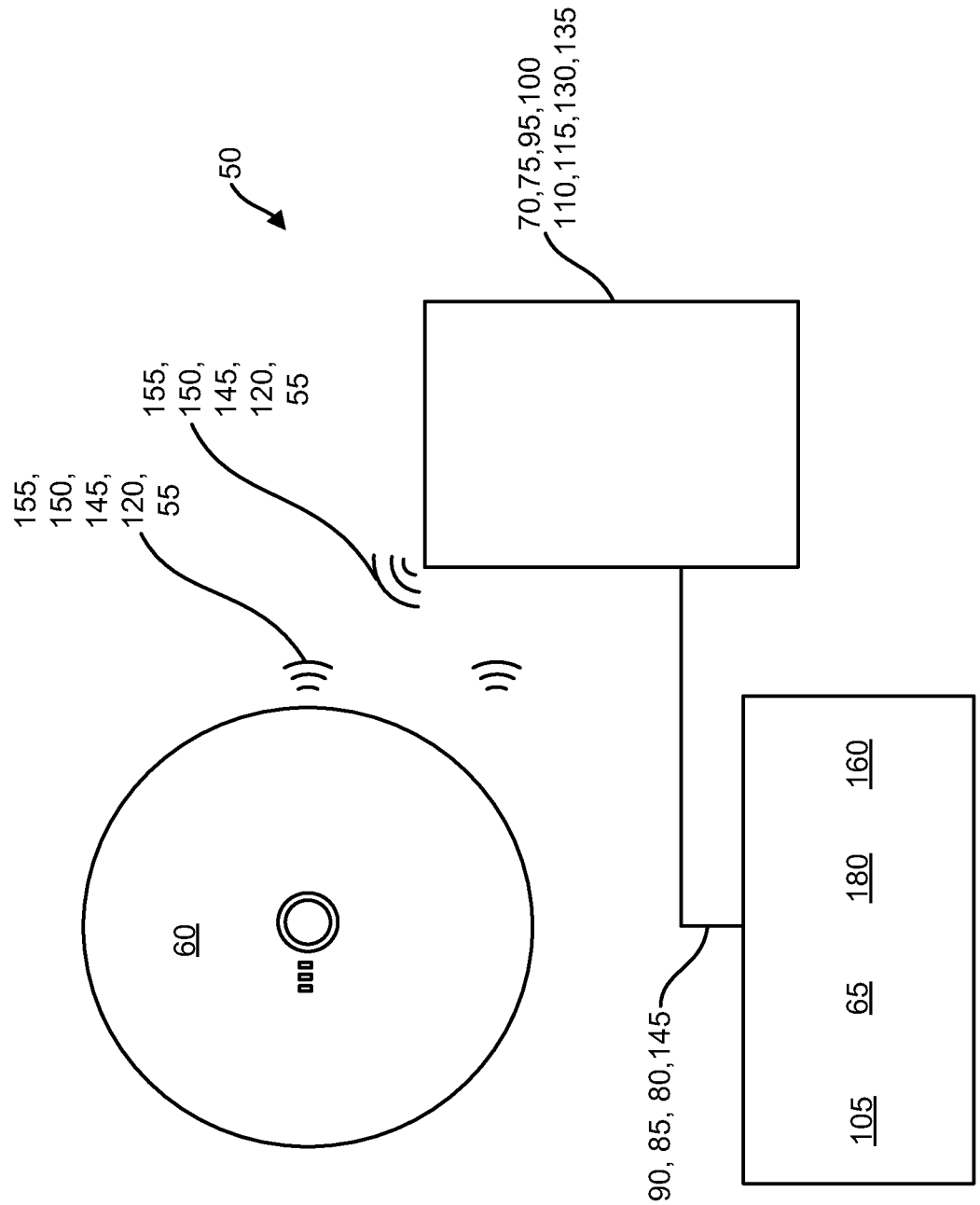
FIG. 1 shows a summary schematic block diagram of the building safety system that includes a fire sensing appliance with the accompanying first communication that is shown to be transmitted to the control circuitry that makes a first electrical communication to a building system.

50 Building Safety System
55 First communication that can include blue tooth wireless communication 120, audible communication 125, fire signal 145, perceptible indicator of fire 150, and first sensor signal 155
60 Fire sensing appliance or alternatively carbon monoxide detector, propane detector, natural gas detector, and the like
65 Building system that can include HVAC systems, windows opening and shutting, doors opening and shutting, lights on and off, and the like
70 Control circuitry
75 First event marker signal
80 First electrical communication
85 Second electrical communication
90 Third electrical communication
95 First electrical switch
100 First relay
105 Power source or power supply
110 First receiver circuitry
115 Second receiver circuitry
120 Bluetooth wireless communication
125 Audible communication
130 First reset timeout circuitry
135 Second reset timeout circuitry
140 Fire
145 Fire signal
150 Perceptible indicator of fire
155 First sensor signal
160 Heating or ventilation or air conditioning system (HVAC) as the building system 65
165 Residential building
170 HVAC air outlet
175 HVAC air inlet
180 Thermostat
185 Pulse Density Modulation (PDM) Microphone preferably a Knowles model number SPH0641LM4H-1 or equivalent
190 Micro Controller Unit (MCU) programmable microcontroller chip with memory and clock preferably a Cypress model number PSOC61 series or equivalent
195 Digital relay or digital switch preferably a Sensata model number DO061A or equivalent
200 Power Management Integrated Circuit (PMIC) Linear Voltage Regulator preferably a Linear Tech model number LT3014 or equivalent
205 Power source 105 distribution to the microphone 185, first receiver circuitry 110, second receiver circuitry 115, plus microcontroller unit 190, first reset timeout circuitry 130, second reset timeout circuitry 135, and first relay 100, digital relay 195, all from the linear voltage regulator 200

210 Time and date stamp signal

215 First selected time

220 Second selected clearing time that is longer than the first selected time 215

DETAILED DESCRIPTION

With initial reference to FIG. 1 shown is a summary schematic block diagram of the building safety system 50 that includes a fire sensing appliance 60 with the accompanying first communication 55 that is shown to be transmitted to the control circuitry 70 that makes a first electrical communication 80 to a building system 65.

Figure 2:
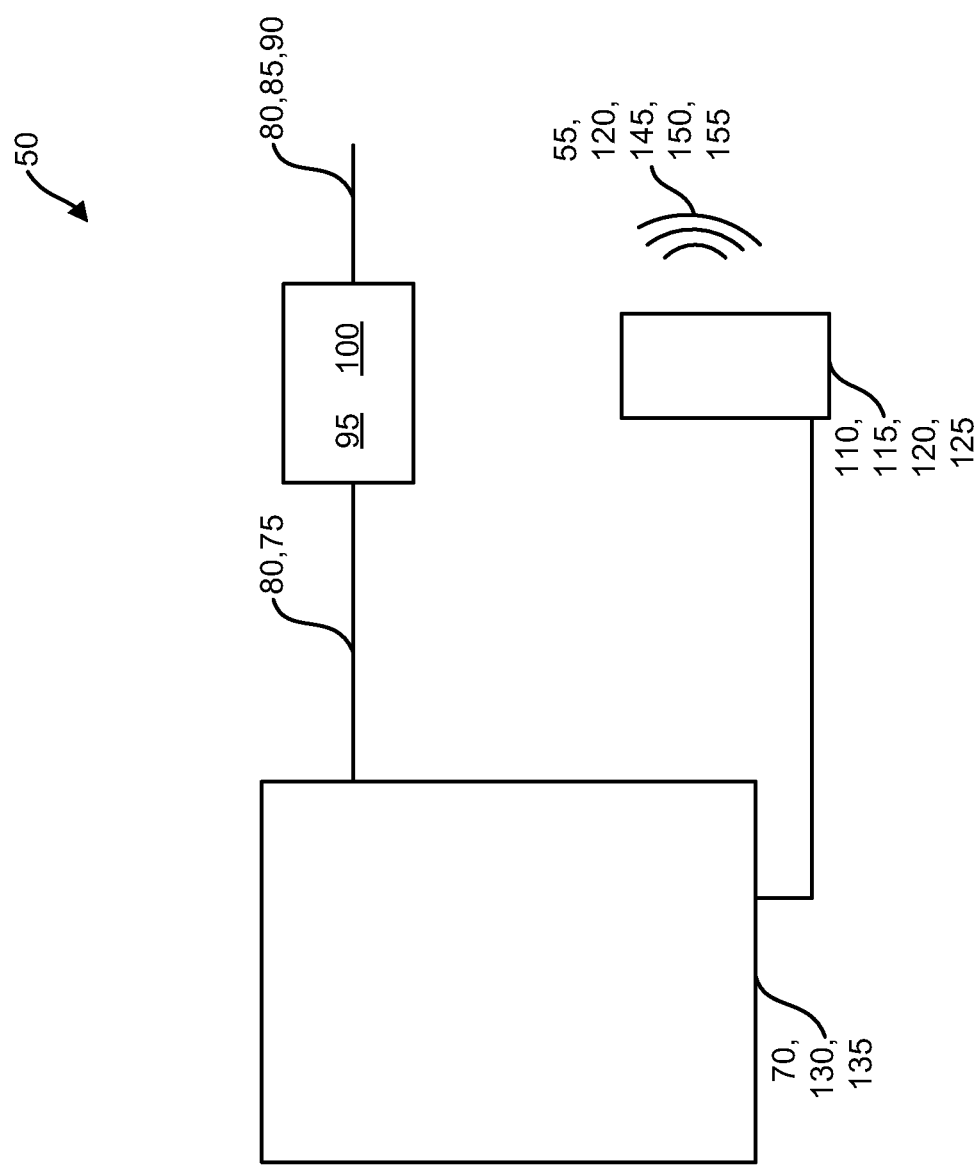
FIG. 2 shows a schematic block diagram of the control circuitry of the building safety system, wherein the control circuitry includes the first communication to a first receiver circuitry of the control circuitry that outputs the first electrical communication to the first electrical switch.

Continuing, FIG. 2 shows a schematic block diagram of the control circuitry 70 of the building safety system 50, wherein the control circuitry 70 includes the first communication 55 to a first receiver circuitry 110 of the control circuitry 70 that outputs the first electrical communication 80 to the first electrical switch 95.

Figure 3:
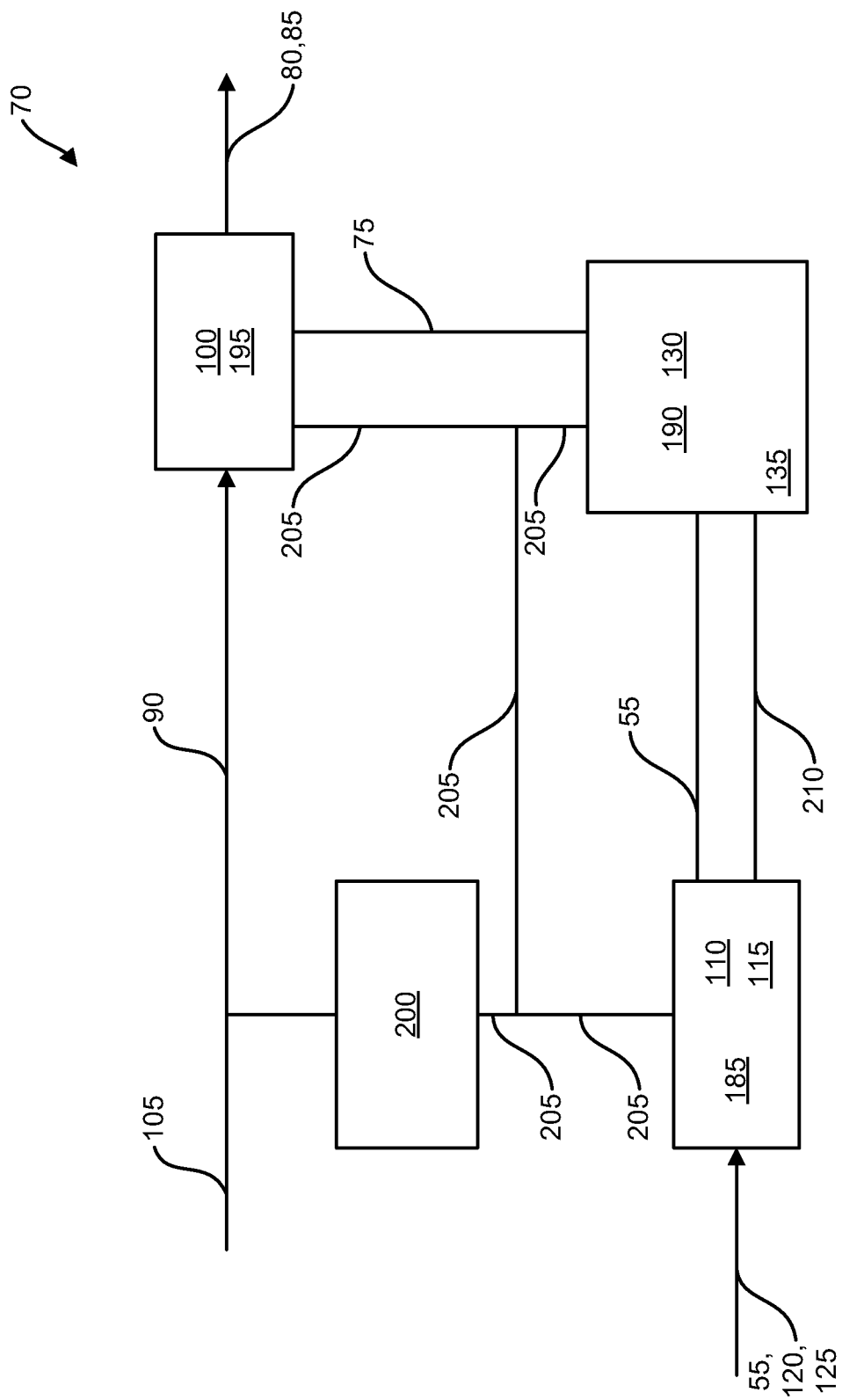
FIG. 3 shows a more detailed schematic block diagram of the control circuitry that includes a power source that is in electrical communication with a power management integrated circuit linear voltage regulator that has an output distribution to a pulse density modulation microphone, a micro controller unit, and a digital relay or switch, further shown is the power supply being a third electrical communication to the digital relay or the switch, thus the power supply becomes switched as it communicates through the first and second electrical communication to the building system (not shown), in addition the first communication feeds into the first or second receiver circuitry or microphone, with the first communication continuing to the micro controller unit that communicates a first event marker signal to the digital relay or switch that in turn effectuates a selected response from the building system (not shown)

Next, FIG. 3 shows a more detailed schematic block diagram of the control circuitry 70 that includes a power source 105 that is in electrical communication with a power management integrated circuit linear voltage regulator 200 that has an output distribution 205 to a pulse density modulation microphone 185, a micro controller unit 190, and a digital relay 195 or switch 100, further shown is the power supply 105 being a third electrical communication 90 to the digital relay 195 or the switch 100, thus the power supply 105 becomes switched 100, 195 as it communicates through the first 80 and second 85 electrical communication to the building system 65 (not shown), in addition the first communication 55 feeds into the first 110 or second 115 receiver circuitry or microphone 185, with the first communication 55 continuing to the micro controller unit 190 that communicates a first event marker signal 75 to the digital relay 195 or switch 100 that in turn effectuates a selected response from the building system 65 (not shown).

Figure 4:
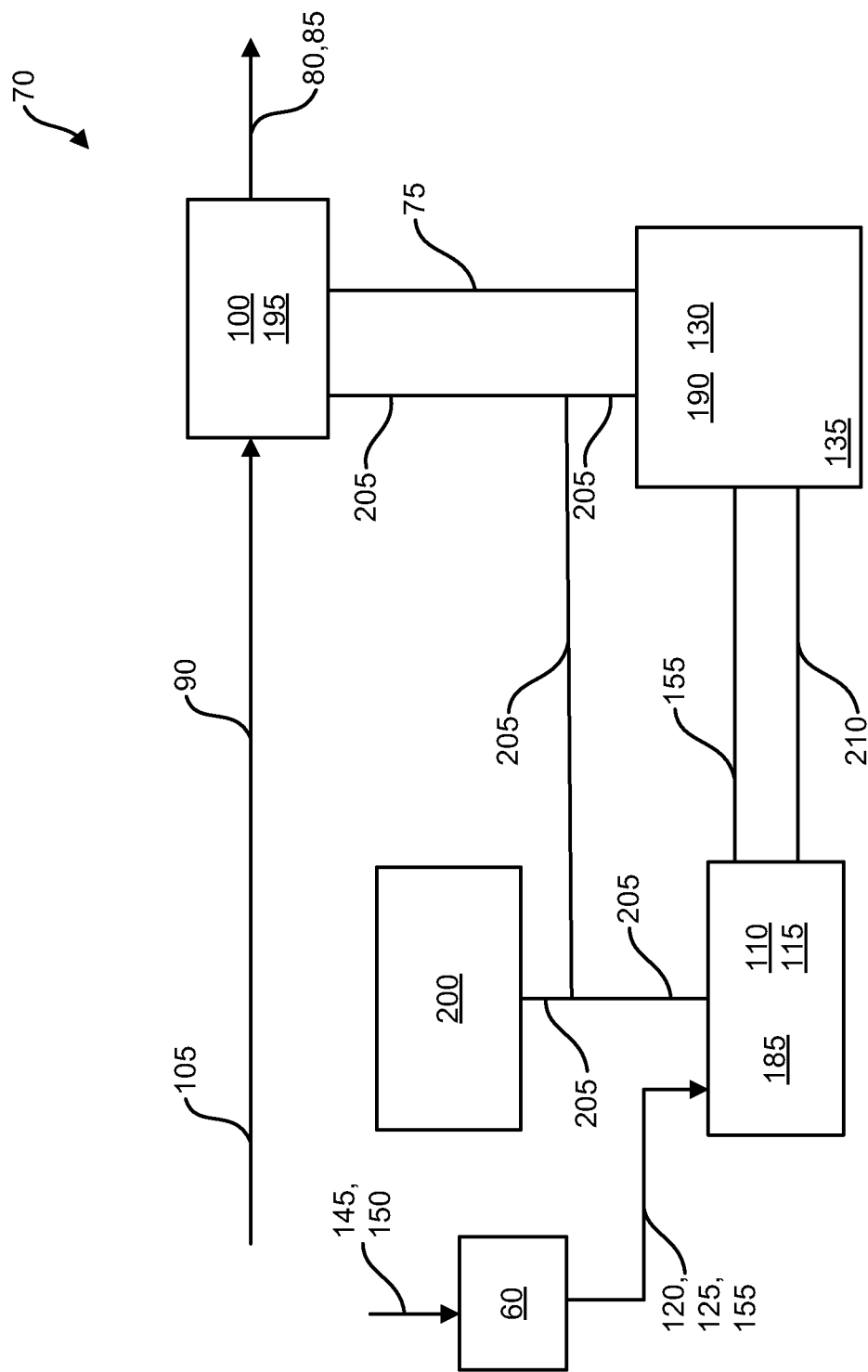
FIG. 4 shows a more detailed schematic block diagram of the control circuitry that includes a power source that is in electrical communication with a power management integrated circuit linear voltage regulator that has an output distribution to a pulse density modulation microphone, a micro controller unit, and a digital relay or switch, also a fire sensing appliance is shown that is in communication with a first sensor signal to the first or second receiver circuitry or microphone, further shown is the power supply being a third electrical communication to the digital relay or the switch, thus the power supply becomes switched as it communicates through the first and second electrical communication to the building system (not shown), in addition the first sensor signal into the first or second receiver circuitry or microphone, with the first sensor signal communicating to the micro controller unit that communicates a first event marker signal to the digital relay or switch that in turn effectuates a selected response from the building system (not shown)

Further, FIG. 4 shows a more detailed schematic block diagram of the control circuitry 70 that includes a power source 105 that is in electrical communication with a power management integrated circuit linear voltage regulator 200 that has an output distribution 205 to a pulse density modulation microphone 185, a micro controller unit 190, and a digital relay 195 or switch 100, also a fire sensing appliance 60 is shown that is in communication with a first sensor signal 155 to the first 110 or second 115 receiver circuitry or microphone 185, further shown is the power supply 105 being the third electrical communication 90 to the digital relay 195 or the switch 100, thus the power supply 105 becomes switched 100, 195 as it communicates through the first 80 and second 85 electrical communication to the building system 65 (not shown), in addition the first sensor signal 155 into the first 110 or second 115 receiver circuitry or microphone 185, with the first sensor signal 155 communicating to the micro controller unit 190 that communicates the first event marker signal 75 to the digital relay 195 or switch 100 that in turn effectuates a selected response from the building system 65 (not shown).

Figure 5:
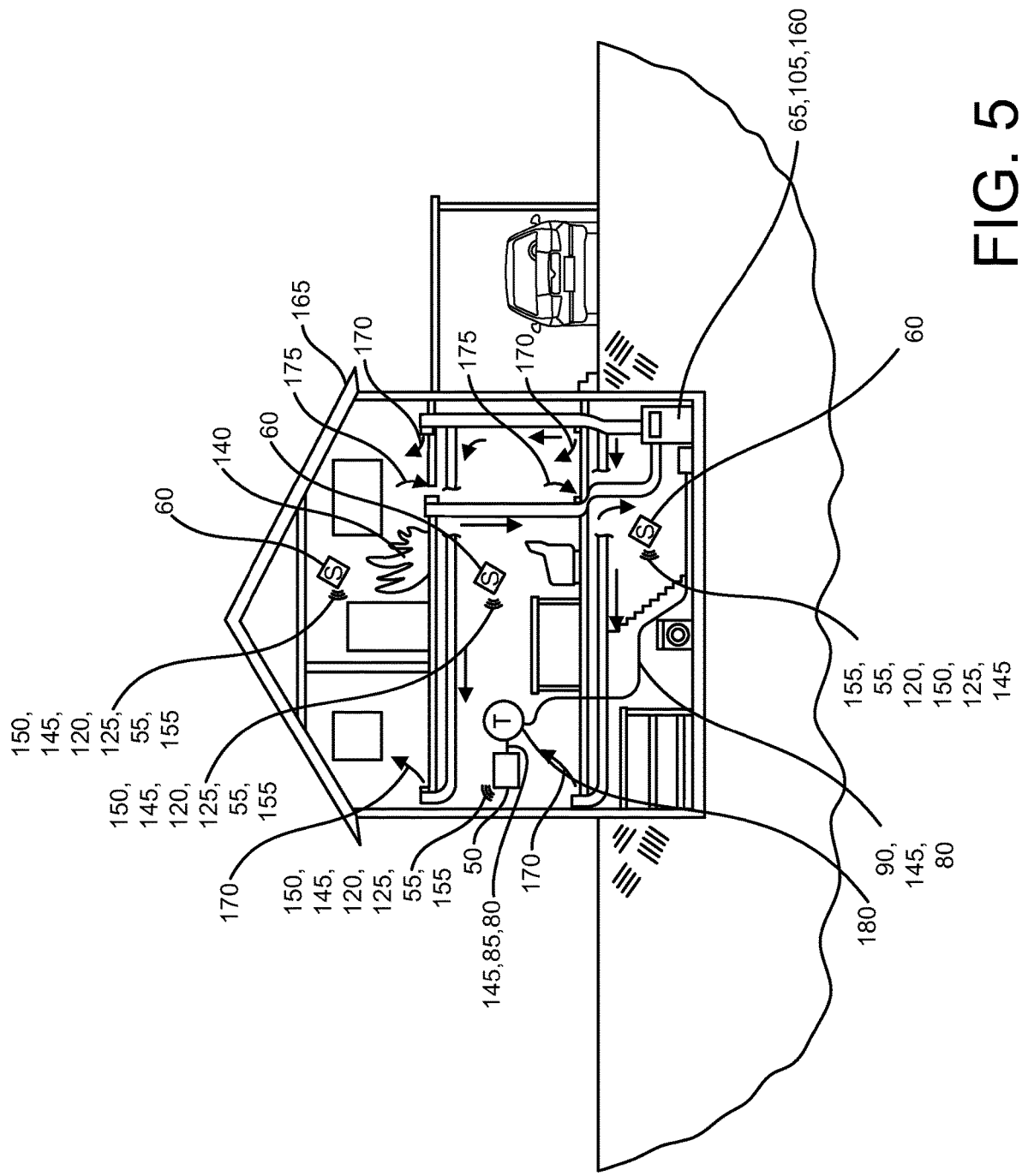
FIG. 5 shows a cross section of a use and installed drawing of the building safety system, wherein the building is a typical residential structure with a basement, main floor, and a second story, further the residential structure shows a building system in the form of a typical heating ventilation and cooling system (HVAC) in the basement with HVAC floor by floor air outlets shown and HVAC floor by floor air inlets shown throughout the residential structure as is also typical, further the placement of a fire sensing appliance on each floor level is shown with each respective first communication from each fire sensing appliance, wherein all of the first communications are in communication with the building safety system that outputs a first electrical communication that can connect with a typical building thermostat or alternatively communicate directly to the building system, wherein operationally if a fire occurs as shown on the second floor, the nearest fire sensing appliance will activate and through the first communication will cause the building safety system to send the first event marker signal to the first relay that will switch the building system to an off operational state to stop the circulation of air at the inlets and outlets to help prevent feeding the fire oxygen, to stop the HVAC system from trying to cool the residential structure, and to help prevent the circulation of toxic smoke throughout the residential building structure to lessen the negative effects of the fire.

Moving ahead, FIG. 5 shows a cross section of a use and installed drawing of the building safety system 50, wherein the building 165 is a typical residential structure with a basement, main floor, and a second story, further the residential structure shows a building system in the form of a typical heating ventilation and cooling system 160 in the basement (HVAC) with HVAC floor by floor air outlets 170 shown and HVAC floor by floor air inlets 175 shown throughout the residential structure as is also typical, further the placement of a fire sensing appliance 60 on each floor level is shown with each respective first communication 55 from each fire sensing appliance 60, wherein all of the first communications 55 are in communication with the building safety system 50 that outputs a first electrical communication 80 that can connect with a typical building thermostat 180 or alternatively communicate directly to the building system 65, wherein operationally if a fire 140 occurs as shown on the second floor the nearest fire sensing appliance 60 will activate and through the first communication 55 will cause the building safety system 50 to send the first event marker signal 75 to the first relay 100 that will switch the building system 65 to an off operational state to stop the circulation of air at the inlets 175 and outlets 170 to help prevent feeding the fire 140 oxygen, to stop any cooling efforts by the air conditioning system, and to help prevent the circulation of toxic smoke throughout the residential building structure 165 to lessen the negative effects of the fire 140.

Broadly, in referring to FIGS. 1 to 3 and FIG. 5, the present invention is the building safety system 50 that receives a first communication 55 from a fire sensing appliance 60 and translates the first communication 55 to a building system 65 to effectuate a selected response from the building system 65, being typically a change of operational state being activated or deactivated for the building system 65, the building safety system 50 including control circuitry 70 in a ready state with the ready state being defined as being in a state that is operative to monitor the first communication 55 and to produce a first event marker signal 75 upon receipt of the first communication 55, the first event marker signal 75 is in a first electrical communication 80 with the building system 65, wherein operationally the first event marker signal 75 effectuates the selected response from the building system 65.

Optionally, in referring to FIGS. 1 to 3 and FIG. 5 for the building safety system 50 wherein the control circuitry 70 can further comprise a first electrical switch 95 that is in a second electrical communication 85 with an activation circuit in the building system 65, further the first electrical switch 95 is also in a third electrical communication 90 with a power source 105 of the activation circuit, wherein operationally the first event marker signal 75 places the first electrical switch 95 into an open state to preclude the power source 105 from the third electrical communication 90 to the activation circuit resulting in the building system 65 deactivating. Thus typically the power source 105 would be the 24 Volt power for the thermostat 180 that is also the controlling power source 105 for say the HVAC system, thus the 24 Volt power source 105 is what is switched via the electrical switch 95 to open the circuit for controlling power to the HVAC system.

Alternatively, in referring to FIGS. 1 to 3 and FIG. 5 for the building safety system 50 wherein the control circuitry 70 can further comprise a first relay 100 that is in a second electrical communication 85 with an activation circuit in the building system 65, further the first relay 100 is also in a third electrical communication 90 with a power source 105 of the activation circuit, wherein operationally the first event marker signal 75 places the first relay 100 into an open state to preclude the power source 105 from the third electrical communication 90 to the activation circuit resulting in the building system 65 deactivating. Thus typically the power source 105 would be the 24 Volt power for the thermostat 180 that is also the controlling power source 105 for say the HVAC system, thus the 24 Volt power source 105 is what is switched via the first relay 100 to open the circuit for controlling power to the HVAC system.

As another option, in referring to FIGS. 1 to 3 and FIG. 5 for the building safety system 50 wherein the control circuitry 70 can further comprise a first receiver circuitry 110 that can accept blue tooth wireless communication 120 as the first communication 55. With the first communication 55 typically being from the fire sensing appliance 60.

As a further alternative, in referring to FIGS. 1 to 3 and FIG. 5 for the building safety system 50 wherein the control circuitry 70 can further comprise a second receiver circuitry 115 that can accept audible communication 125 as the first communication 55. With the first communication 55 typically being from the fire sensing appliance 60.

As a further option, in referring to FIGS. 1 to 3 and FIG. 5 for the building safety system 50 wherein the control circuitry 70 can further comprise a first reset timeout circuitry 130 that can operationally accommodate false alarms via the first communication 55 being manually terminated within a first selected time 215 and placing the control circuitry 70 in the ready state. This would typically be the situation where say cooking smoke from the kitchen would accidently set off the fire sensing appliance 60, wherein the home occupant would manually disable the first communication 55 in a fairly timely manner, being the first selected time 215, with the result that the first reset timeout circuitry 130 would automatically re-place the control circuitry 70 into the ready state.

As a further alternative, in referring to FIGS. 1 to 3 and FIG. 5 for the building safety system 50 wherein the control circuitry 70 can further comprise a second reset timeout circuitry 135 that can operationally reset into the ready state after the first communication 55 naturally terminates then having a second selected clearing time 220 prior to placing the control circuitry 70 into the ready state. This would typically be the situation where the fire sensing appliance 60 did sense an actual fire 140 with the first communication 55 alerting the control circuitry 70 to send the first event marker signal 75 thereby disabling the HVAC system 65 as previously described, however after an extended amount of time being the second selected clearing time 220 that is longer than the first selected time 215, with the fire 140 presumably being taken care of at this point, then the second reset timeout circuitry 135 would automatically re-place the control circuitry 70 into the ready state.

Again Broadly, in referring to FIGS. 1 and 2 plus FIGS. 4 and 5, the present invention is the building safety system 50 for communicating a fire signal 145 to the building system 65 to effectuate a selected response from the building system 65, being typically a change of operational state being activated or deactivated for the building system 65, the building safety system 50 includes a fire sensor appliance 60 that converts a perceptible indicator of fire 150 into generating a first sensor signal 155. Further included in the building safety system 50 is control circuitry 70 that is operative to monitor the first sensor signal 155 and to produce a first event marker signal 75 upon receipt of the first sensor signal 155, all while the control circuitry is in a ready state, with the ready state being defined as being in a state that is operative to monitor the first communication 55 and to produce a first event marker signal 75 upon receipt of the first communication 55, wherein the first event marker signal 75 is in a first electrical communication 80 with the building system 65, wherein operationally the first event marker signal 75 effectuates the selected response from the building system 65.

Optionally, in referring to FIGS. 1 and 2 plus FIGS. 4 and 5 for the building safety system 50 wherein the control circuitry 70 can further comprise a first electrical switch 95 that is in a second electrical communication 85 with an activation circuit in the building system 65, further the first electrical switch 95 is also in a third electrical communication 90 with a power source 105 of the activation circuit, wherein operationally the first event marker signal 75 places the first electrical switch 95 into an open state to preclude the power source 105 from the third electrical communication 90 to the activation circuit resulting in the building system 65 deactivating. Thus typically the power source 105 would be the 24 Volt power for the thermostat 180 that is also the controlling power source 105 for say the HVAC system, thus the 24 Volt power source 105 is what is switched via the electrical switch 95 to open the circuit for controlling power to the HVAC system.

Alternatively, in referring to FIGS. 1 and 2 plus FIGS. 4 and 5 for the building safety system 50 wherein the control circuitry 70 can further comprise a first relay 100 that is in a second electrical communication 85 with an activation circuit in the building system 65, further the first relay 100 is also in a third electrical communication 90 with a power source 105 of the activation circuit, wherein operationally the first event marker signal 75 places the first relay 100 into an open state to preclude the power source 105 from the third electrical communication 90 to the activation circuit resulting in the building system 65 deactivating. Thus typically the power source 105 would be the 24 Volt power for the thermostat 180 that is also the controlling power source 105 for say the HVAC system, thus the 24 Volt power source 105 is what is switched via the first relay 100 to open the circuit for controlling power to the HVAC system.

As another option, in referring to FIGS. 1 and 2 plus FIGS. 4 and 5 for the building safety system 50 wherein the control circuitry 70 can further comprise a first receiver circuitry 110 that can accept blue tooth wireless communication 120 as the first communication 55. With the first communication 55 typically being from the fire sensing appliance 60.

As a further alternative, in referring to FIGS. 1 and 2 plus FIGS. 4 and 5 for the building safety system 50 wherein the control circuitry 70 can further comprise a second receiver circuitry 115 that can accept audible communication 125 as the first communication 55. With the first communication 55 typically being from the fire sensing appliance 60.

As a further option, in referring to FIGS. 1 and 2 plus FIGS. 4 and 5 for the building safety system 50 wherein the control circuitry 70 can further comprise a first reset timeout circuitry 130 that can operationally accommodate false alarms via the first communication 55 being manually terminated within a first selected time 215 and placing the control circuitry 70 in the ready state. This would typically be the situation where say cooking smoke from the kitchen would accidently set off the fire sensing appliance 60, wherein the home occupant would manually disable the first communication 55 in a fairly timely manner, being the first selected time 215, with the result that the first reset timeout circuitry 130 would automatically re-place the control circuitry 70 into the ready state.

As a further alternative, in referring to FIGS. 1 and 2 plus FIGS. 4 and 5 for the building safety system 50 wherein the control circuitry 70 can further comprise a second reset timeout circuitry 135 that can operationally reset into the ready state after the first communication 55 naturally terminates then having a second selected clearing time 220 prior to placing the control circuitry 70 into the ready state.

This would typically be the situation where the fire sensing appliance 60 did sense an actual fire 140 with the first communication 55 alerting the control circuitry 70 to send the first event marker signal 75 thereby disabling the HVAC system 65 as previously described, however after an extended amount of time being the second selected clearing time 220 that is longer than the first selected time 215, with the fire 140 presumably being taken care of at this point, then the second reset timeout circuitry 135 would automatically re-place the control circuitry 70 into the ready state.

CONCLUSION

Accordingly, the present invention of an Building Safety System has been described with some degree of particularity directed to the embodiments of the present invention. It should be appreciated, though; that the present invention is defined by the following claims construed in light of the prior art so modifications or changes may be made to the exemplary embodiments of the present invention without departing from the inventive concepts contained therein.

The invention claimed is:

1. A building safety system that receives a first communication from a fire sensing appliance and translates the first communication to a building system that has a power source, with the building system in the form of an activated operational state; heating, ventilation, and air conditioning (HVAC) system to effectuate a deactivated operational state for the HVAC building system, said building safety system comprising:
   (a) control circuitry that includes;
   (a)(i) a pulse density modulation microphone;
   (a)(ii) a power management integrated circuit linear voltage regulator;
   (a)(iii) a programmable micro controller chip with memory and clock;
   (a)(iv) a digital relay; and
   the power source is in electrical communication with said power management integrated circuit linear voltage regulator that has a power source output distribution to said pulse density modulation microphone, said a programmable micro controller chip with memory and clock, and said digital relay, wherein operationally the first communication in the form of an audible first communication goes from the fire sensing appliance to said pulse density modulation microphone, wherein said pulse density modulation microphone continues the first communication to said programmable micro controller chip with memory and clock that communicates a first event marker signal to said digital relay that electrically opens a third electrical communication that communicates through a first and a second electrical communication, that places the HVAC system into the deactivated operational state to operationally preclude building interior air circulation to reduce interior building circulation of toxic smoke, to reduce feeding the fire oxygen, and to stop air conditioning cooling system activation, if the HVAC system has a thermostat said second electrical communication will deactivate the HVAC system, if the HVAC system does not have a thermostat said third electrical communication will deactivate the HVAC system, by default said control circuitry is in a ready state that is defined as being operative to monitor the first communication and to produce said first event marker signal upon receipt of the first communication.

2. A building safety system according to claim 1 wherein said control circuitry further comprises a first receiver circuitry, wherein said first receiver circuitry receives a power source output distribution from said power management integrated circuit linear voltage regulator, wherein said first receiver circuitry has the first communication in the form of a blue tooth wireless communication, wherein said first receiver circuitry continues the first communication to said programmable micro controller chip with memory and clock that communicates said first event marker signal to said digital relay that electrically opens said third electrical communication that communicates through said first and second electrical communications, that places the HVAC system into the deactivated operational state to operationally preclude building interior air circulation to reduce interior building circulation of toxic smoke, to reduce feeding the fire oxygen, and to stop air conditioning cooling system activation.

3. A building safety system according to claim 1 wherein said control circuitry further comprises a first reset timeout circuitry, wherein said first reset timeout circuitry receives a power source output distribution from said power management integrated circuit linear voltage regulator, wherein said first reset timeout circuitry can operationally accommodate false fire alarms via the first communication being manually terminated within a first selected time and placing said control circuitry in said ready state.

4. A building safety system according to claim 1 wherein said control circuitry further comprises a second reset timeout circuitry, wherein said second reset timeout circuitry receives a power source output distribution from said power management integrated circuit linear voltage regulator, wherein said second reset timeout circuitry can operationally reset into said ready state after the first communication naturally terminates after the fire is presumed to be extinguished then having a second selected clearing time prior to placing said control circuitry into said ready state.

* * * * *